US010001022B2

(12) United States Patent
Strock et al.

(10) Patent No.: US 10,001,022 B2
(45) Date of Patent: Jun. 19, 2018

(54) SEALS FOR GAS TURBINE ENGINE

(71) Applicant: United Technologies Corporation, Hartford, CT (US)

(72) Inventors: Christopher W. Strock, Kennebunk, ME (US); Paul M. Lutjen, Kennebunkport, ME (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days. days.

(21) Appl. No.: 14/394,215

(22) PCT Filed: Apr. 21, 2014

(86) PCT No.: PCT/US2014/034815
§ 371 (c)(1),
(2) Date: Oct. 13, 2014

(87) PCT Pub. No.: WO2014/204574
PCT Pub. Date: Dec. 24, 2014

(65) Prior Publication Data
US 2016/0290150 A1    Oct. 6, 2016

Related U.S. Application Data

(60) Provisional application No. 61/838,051, filed on Jun. 21, 2013.

(51) Int. Cl.
*F01D 11/08* (2006.01)
*F01D 11/00* (2006.01)
(Continued)

(52) U.S. Cl.
CPC ............... *F01D 11/08* (2013.01); *F01D 5/02* (2013.01); *F01D 11/003* (2013.01);
(Continued)

(58) Field of Classification Search
CPC .......... F01D 11/00; F01D 11/02; F01D 11/08; F01D 5/02; F01D 11/003; F01D 17/105;
(Continued)

(56) References Cited

U.S. PATENT DOCUMENTS 3,368,819 A * 2/1968 Otto ..................... F16J 15/3456
277/366
4,420,161 A * 12/1983 Miller ..................... F01D 25/04
277/418

(Continued)

FOREIGN PATENT DOCUMENTS

GB          2102897 A  *  2/1983 ............. F01D 9/023

OTHER PUBLICATIONS

Notification of Transmittal of the International Search Report and the Written Opinion of the International Searching Authority, or the Declaration, International Application No. PCT/US14/34815, dated Nov. 21, 2014,.

(Continued)

*Primary Examiner* — Kenneth Bomberg
*Assistant Examiner* — Brian Delrue
(74) *Attorney, Agent, or Firm* — Snell & Wilmer, L.L.P.

(57) ABSTRACT

The present disclosure relates to a first seal for an aircraft blade outer air seal ("BOAS") comprising a first portion comprising a first channel and a second channel, and a second portion comprising a first projection and a second projection, wherein the first projection slidably couples to the first channel and the second projection slidably couples to the second channel. The first portion and/or the second portion may be coated with a low friction substance. The first portion may be coupled to a vane support and/or a BOAS, and the second portion may be coupled to a first OAS support. The first seal may enable a radial translation of the BOAS in response to an aircraft maneuver.

13 Claims, 4 Drawing Sheets

(51) Int. Cl.
*F16J 15/3224* (2016.01)
*F16J 15/44* (2006.01)
*F01D 5/02* (2006.01)
*F01D 17/10* (2006.01)
*F01D 25/12* (2006.01)

(52) U.S. Cl.
CPC ............ *F01D 17/105* (2013.01); *F01D 25/12* (2013.01); *F16J 15/3224* (2013.01); *F16J 15/445* (2013.01); *F05D 2220/323* (2013.01); *F05D 2300/2281* (2013.01); *F05D 2300/2284* (2013.01); *Y02T 50/672* (2013.01)

(58) Field of Classification Search
CPC ...... F01D 25/12; F16J 15/3224; F16J 15/445; F05D 2220/323; F05D 2300/2281; F05D 2300/2284; Y02T 50/672
USPC .... 415/1, 116; 277/372, 374, 375, 391, 394, 277/395, 418, 425, 433, 491, 647
See application file for complete search history.

(56) References Cited

U.S. PATENT DOCUMENTS

| | | | | |
|---|---|---|---|---|
| 4,485,620 A * | 12/1984 | Koenig | ............... | F01D 9/023 415/116 |
| 4,527,385 A * | 7/1985 | Jumelle | ............... | F01D 11/18 415/116 |
| 4,565,492 A * | 1/1986 | Bart | ............... | F01D 11/18 415/116 |
| 5,048,288 A * | 9/1991 | Bessette | ............... | F01D 11/24 415/116 |
| 5,593,278 A | 1/1997 | Jourdain et al. | | |
| 5,961,388 A | 10/1999 | Breidenbach et al. | | |
| 7,186,074 B2 * | 3/2007 | Blatchford | ............... | F01D 25/26 277/347 |
| 7,494,317 B2 * | 2/2009 | Keller | ............... | F01D 11/025 415/135 |
| 8,052,385 B2 | 11/2011 | Thompson et al. | | |
| 8,123,466 B2 * | 2/2012 | Pietraszkiewicz | ...... | F01D 11/08 415/116 |
| 8,162,598 B2 | 4/2012 | Liang | | |
| 8,328,507 B2 | 12/2012 | Mccaffrey | | |
| 8,353,663 B2 * | 1/2013 | Arzel | ............... | F01D 5/08 415/115 |
| 9,039,358 B2 * | 5/2015 | Tholen | ............... | F01D 11/12 415/173.3 |
| 9,447,696 B2 * | 9/2016 | McCaffrey | ............ | F01D 11/18 |
| 2002/0076319 A1 * | 6/2002 | Oya | ............... | F01D 9/065 415/115 |
| 2004/0071548 A1 * | 4/2004 | Wilson, Jr. | ............ | F01D 11/18 415/173.1 |
| 2005/0265827 A1 * | 12/2005 | Wilson, Jr. | ............ | F01D 11/18 415/173.3 |
| 2009/0148277 A1 * | 6/2009 | Tholen | ............... | F01D 11/025 415/173.1 |
| 2014/0252721 A1 * | 9/2014 | Gore | ............... | F01D 11/02 277/418 |
| 2015/0007581 A1 * | 1/2015 | Sezer | ............... | F01D 11/24 60/806 |
| 2016/0003078 A1 * | 1/2016 | Stevens | ............ | F01D 11/005 277/647 |
| 2016/0153306 A1 * | 6/2016 | Romanov | ............ | F01D 11/18 60/796 |

OTHER PUBLICATIONS

International Preliminary Examination Report for International Application No. PCT/US14/34815, dated Jun. 2, 2015.
Notice of Grant dated Feb. 13, 2018 in United Kingdom Application No. GB1418236.4.
Examination Report dated Oct. 30, 2017 in United Kingdom Application No. GB1418236.4.

* cited by examiner

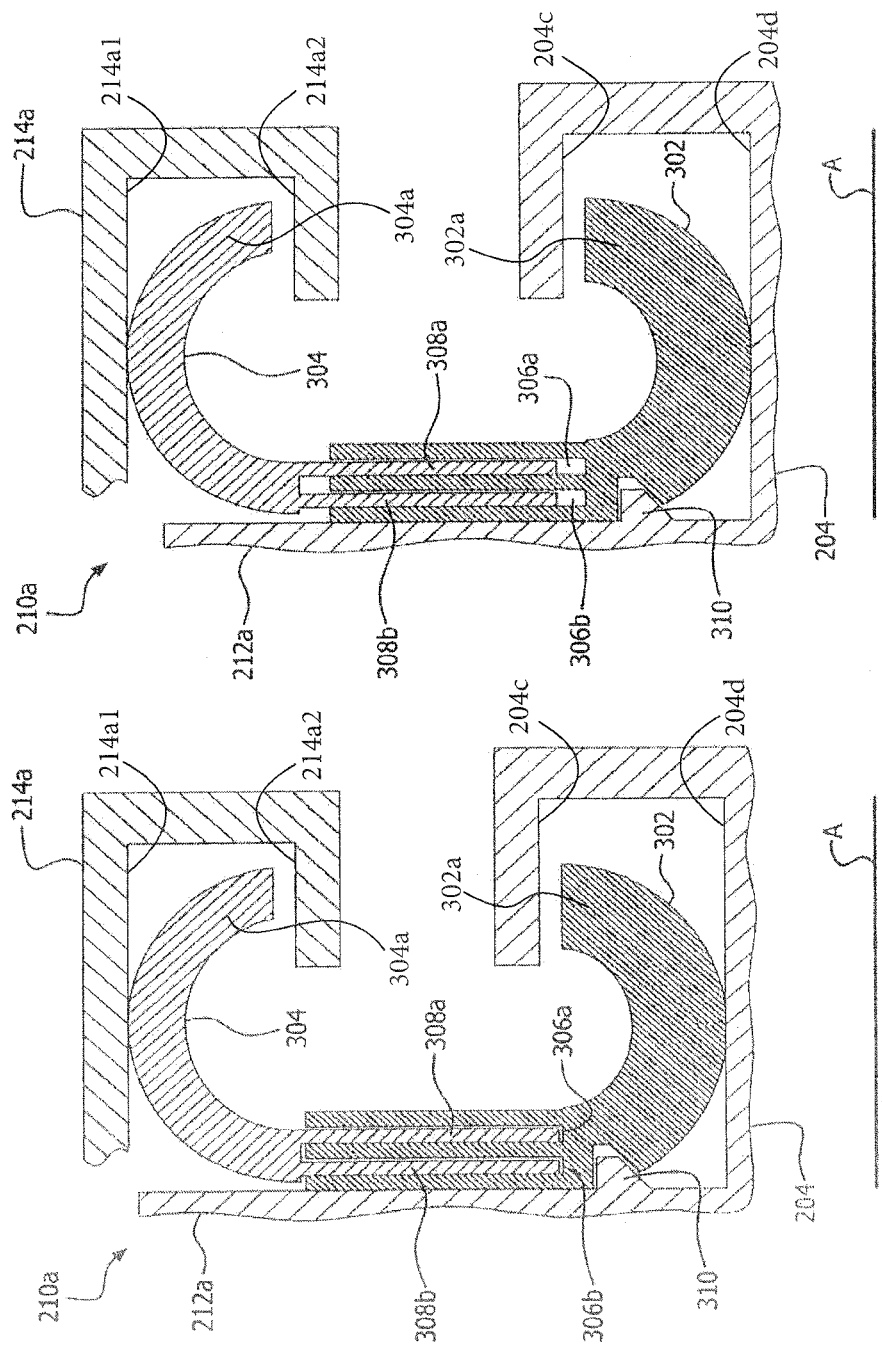

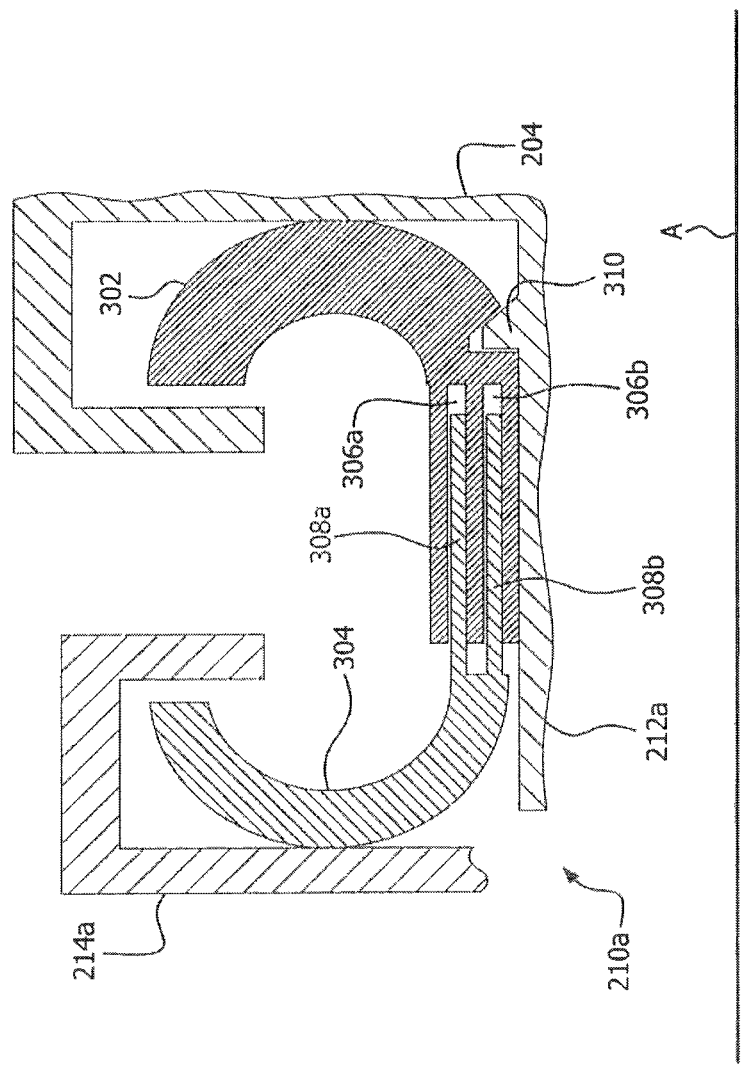

SEALS FOR GAS TURBINE ENGINE

CROSS-REFERENCE TO RELATED APPLICATIONS

This application is a U.S. national phase filing under 35 U.S.C. § 371 of PCT/US14/34815 and entitled, "SEALS FOR GAS TURBINE ENGINE," filed on Apr. 21, 2014, and claims priority to U.S. Provisional Application No. 61/838,051, entitled, "SEALS FOR GAS TURBINE ENGINE," which was filed on Jun. 21, 2013, both of which are incorporated herein by reference.

FIELD

The present disclosure is related seals within a static structure, for example, in gas turbine engines as blade outer air seals.

BACKGROUND

Gas turbine engines, such as those that power modern commercial and military aircraft, typically include a compressor to pressurize inflowing air, a combustor to burn a fuel in the presence of the pressurized air, and a turbine to extract energy from the resulting combustion gases. The turbine may include multiple rotatable blade arrays separated by multiple stationary vane arrays. A turbine blade array is typically situated radially within a blade outer air seal system or assembly (or "BOAS" system or assembly). In other words, a BOAS assembly may span an outer endwall between a plurality of static vane arrays situated upstream and downstream of the blade array. The BOAS assembly thus forms an outer (cylindrical) wall configured to confine a stream of hot post-combustion gases. A small tip clearance between the blade and the BOAS may be desirable to maximize the work extracted by the blade array. However, interactions between the blade array and the BOAS may create undesirable distress on either or both components.

Cooling air is often provided to the BOAS to enable operation while exposed to the hot combustion gases. This cooling air may be bled from one or more air compartments situated in proximity to the BOAS and through one or more bleed apertures disposed within the BOAS. A higher pressure may be required to direct cooling air through the BOAS. Effective seals may prevent leakage of cooling air between BOAS sections or segments as well as between the BOAS assembly and adjacent component assemblies (e.g., vanes or vane arrays), thus allowing cooling air to flow within the BOAS segments.

As the turbine is heated by the combustor exhaust and pressurized, the cooling air may undesirably escape into the turbine through a variety of gaps and other pathways formed as a result of thermal and maneuvering stresses placed upon the engine parts during operation. The thermal and pressure induced deflections of individual components may require that some seals perform with substantial relative motion between sealing surfaces. More particularly, various BOAS systems may be capable of expanding and/or contracting in a radial direction to compensate for a radial motion of the blades or blade tips resulting from the forces placed upon the blades during operation (e.g., a maneuvering operation). Thus, various conventional BOAS may radially expand and contract in response to forces generated within a turbine as a result of flight. As described above, however, one or more air seals may be included between a BOAS and adjacent air seals to create a cooling air compartment. These seals may, in various conventional systems, inhibit or limit the radial motion of a BOAS. For example, although it may be desirable during an aircraft maneuver to translate a BOAS a first radial distance to avoid contact with one or more blade tips, the seals preventing leakage between the one or more cooling air compartments and the turbine may limit such BOAS motion, for example, by physically inhibiting motion or by ceasing to perform as intended, thereby reducing the passage of cooling air through the BOAS.

SUMMARY

The present disclosure relates to a first seal that includes a first portion comprising a first channel and a second channel, and a second portion comprising a first projection and a second projection, wherein the first projection slidably couples to the first channel and the second projection slidably couples to the second channel. In various embodiments, the first portion and/or the second portion may be coated with a low friction substance. In addition, the first seal may accommodate a relative axial motion. The first portion may be coupled to a vane support and/or a BOAS, and the second portion may be coupled to a first BOAS support. The first seal may enable a radial translation of the BOAS, in response to an aircraft maneuver.

The present disclosure further relates to a BOAS comprising a plurality of bleed apertures that vent compressed air over a turbine stage to cool the turbine stage during operation, wherein the BOAS may be coupled to a first seal that enables a radial translation of the BOAS and/or a second seal that further enables the radial translation of the BOAS. In various embodiments, the first seal may comprise a first portion slidably coupled to a second portion. The first portion may further comprise a first channel that slidably receives a first projection extending from the second portion. Further, the first portion may comprise a second channel that slidably receives a second projection extending from the second portion. In various embodiments, the first seal and/or second seal may be coated with a low friction substance, such as at least one of Titanium Nitride (TiN), Titanium Aluminum Nitride, or a solid lubricant filled with nickel (Ni).

The present disclosure further relates to a turbine stage of a turbine section of a gas turbine engine comprising a BOAS, a first seal, and/or a second seal, wherein the first seal translates radially to accommodate a radial motion of the BOAS, and wherein the second seal translates radially to accommodate the radial motion of the BOAS. In various embodiments, the first seal may comprise a first portion having a first channel and a second channel, and wherein the first seal may further comprise a second portion having a first projection and a second projection, wherein the first projection may slidably engage with the first channel, and wherein the second projection may slidably engage with the second channel. The first seal and/or the second seal may enable control of cooling air dispensed from an air compartment to the turbine stage. The turbine stage may further comprise a puller that may engage with the BOAS to translate the BOAS in a radial direction. The puller may, in various embodiments, translate the BOAS in a radial direction based upon a motion of an aircraft. Further, at least on of the first seal and the second seal may be coated with a low friction substance.

BRIEF DESCRIPTION OF THE DRAWINGS

Various embodiments are particularly pointed out and distinctly claimed in the concluding portion of the specification. Below is a summary of the drawing figures, wherein like numerals denote like elements and wherein:

FIG. 3 illustrates a side perspective view of a finger seal having a first radial diameter, in accordance with various embodiments;

FIG. 4 illustrates a cross-sectional view of a finger seal having a second radial diameter, in accordance with various embodiments; and FIG. 5 illustrates a cross-sectional view of a finger seal configured to compensate for axial motion.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
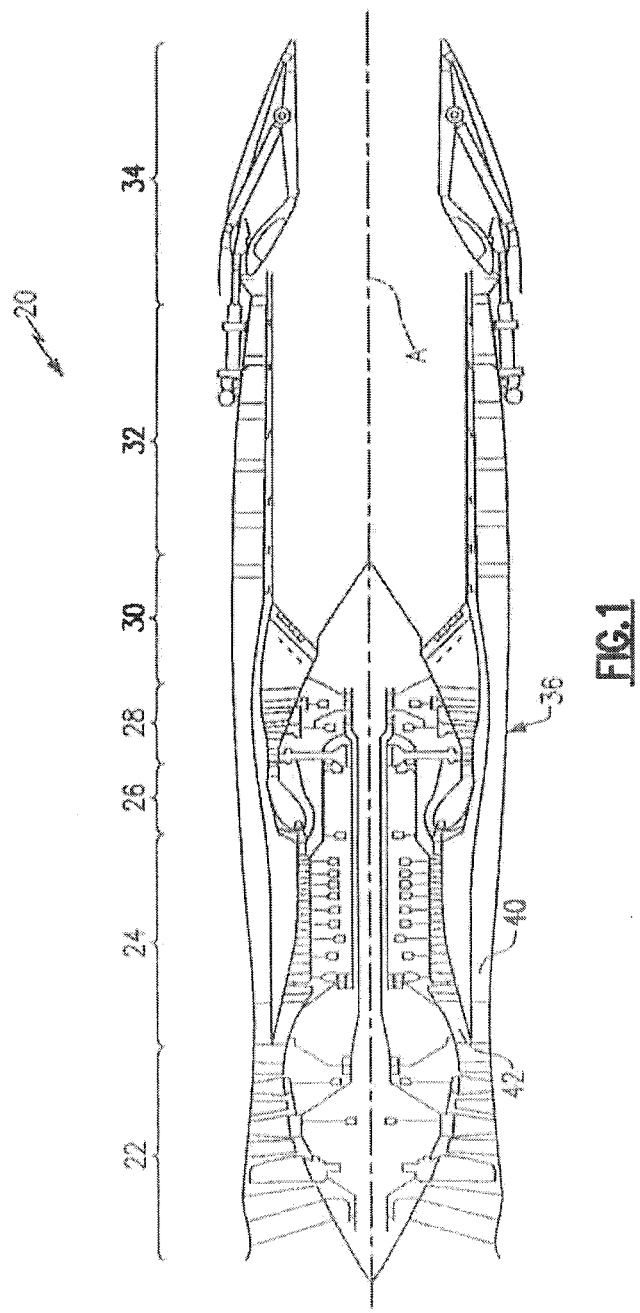
FIG. 1 illustrates a cross-sectional view of a gas turbine engine, in accordance with various embodiments.

Referring to FIG. 1, a gas turbine engine 20 is shown. In various embodiments, the gas turbine engine 20 comprises a two-spool low-bypass augmented turbofan. The turbofan generally incorporates a fan section 22, a compressor section 24, a combustor section 26, a turbine section 28, an augmenter section 30, an exhaust duct section 32, and a nozzle system 34, along a central longitudinal engine axis A. Although depicted as an augmented low bypass turbofan in the non-limiting embodiment of FIG. 1, it should be understood that the concepts described herein are applicable to other gas turbine engines including non-augmented engines, geared architecture engines, direct drive turbofans, turbojet, turboshaft, multi-stream variable cycle adaptive engines, and other engine architectures. Variable cycle gas turbine engines power aircraft over a range of operating conditions and may alter a bypass ratio during flight to achieve countervailing objectives, such as high specific thrust for high-energy maneuvers, optimization of fuel efficiency for cruise and loiter operational modes, etc.

An engine case structure 36 defines a generally annular secondary airflow path 40 around a core airflow path 42. Various case structures and modules may define the engine case structure 36 which defines an exoskeleton to support the rotational hardware.

Air that enters the fan section 22 is divided between a core airflow through the core airflow path 42 and a secondary airflow through a secondary airflow path 40. The core airflow passes through the combustor section 26, the turbine section 28, then the augmentor section 30 where fuel may be selectively injected and burned to generate additional thrust through the nozzle system 34. It should be appreciated that additional airflow streams such as a third stream airflow typical of variable cycle engine architectures may additionally be sourced from the fan section 22.

The secondary airflow may be utilized for multiple purposes including, for example, cooling and pressurization. The secondary airflow may be any airflow different from the core airflow. The secondary airflow may ultimately be at least partially injected into the core airflow path 42 adjacent to the exhaust duct section 32 and the nozzle system 34.

The exhaust duct section 32 may be circular in cross-section, such in an axisymmetric augmented low bypass turbofan or may be non-axisymmetric in cross-section including, for example, a serpentine shape to block direct view to the turbine section 28. In addition to the various cross-sections and the various longitudinal shapes, the exhaust duct section 32 may terminate in a Convergent/Divergent ("C/D") nozzle system, a non-axisymmetric two-dimensional (2D) C/D vectorable nozzle system, a flattened slot nozzle of high aspect ratio or other nozzle arrangement.

Figure 2:
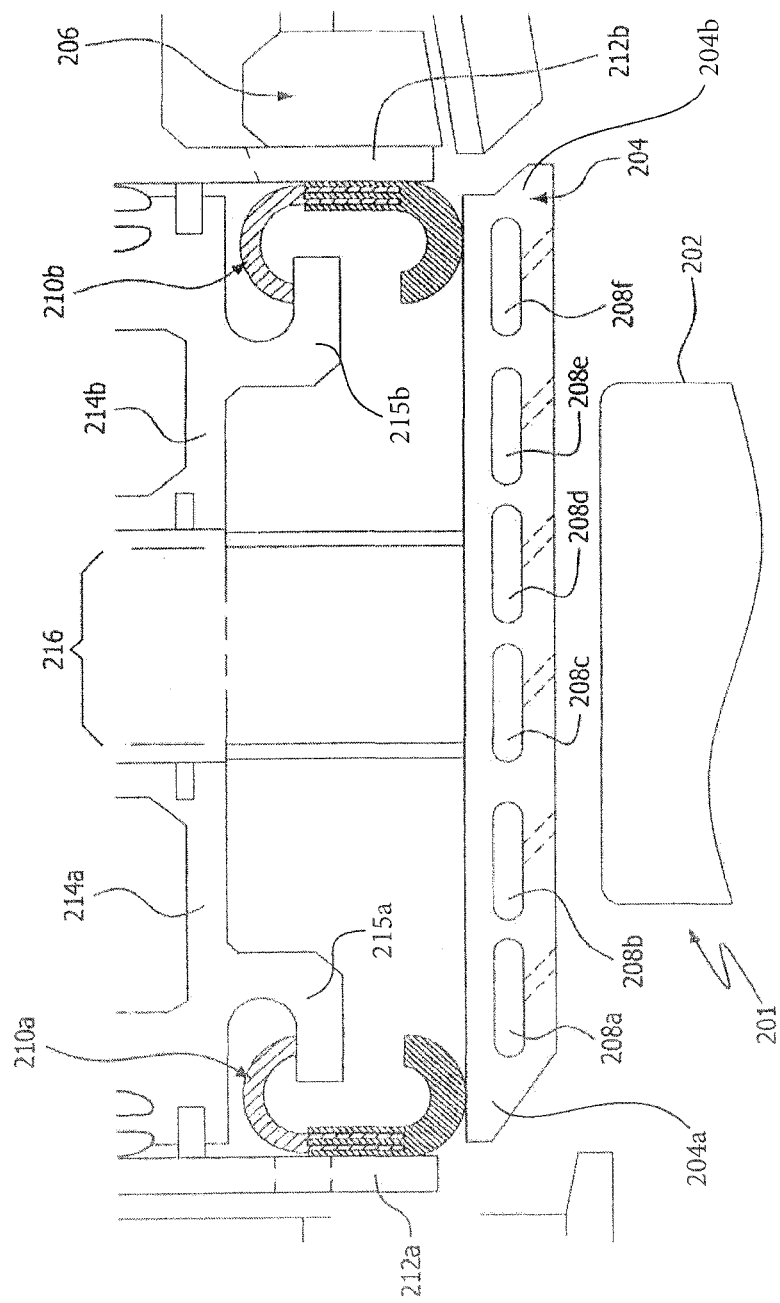
FIG. 2 illustrates a cross-sectional view of BOAS coupled to a plurality of finger seals, in accordance with various embodiments.

Referring generally now to FIG. 2, although a variety of seals (e.g., seal 210a and 210b) or "finger seals" are disclosed in relation to a blade outer air seal (or "BOAS"), in various embodiments, the finger seals disclosed herein may be used to form a seal between any two or more components, particularly where those components may experience a motion relative to one or more other components.

Thus, as described herein, in various embodiments, a blade outer air seal ("BOAS") assembly or system may comprise one or more BOAS arranged around the turbine 20 or around particular stages or sections of the turbine 20. For example, one or more turbine stages 201 (e.g., concentric turbine rotors or blades) may be enclosed by an associated BOAS system. Likewise, one or more compressor stages (e.g., concentric compressor rotors or blades) may be enclosed by an associated BOAS system.

Therefore, as described herein, the BOAS system may comprise a plurality of BOASs 204, having a forward portion 204a and an aft portion 204b which may together enclose a turbine stage 201 and/or a compressor stage. For example, in various embodiments, a single BOAS 204 may comprise between 2 degrees and 18 degrees of a circumference of a BOAS system. Thus, in various embodiments, a BOAS system may comprise between 20 and 180 BOASs.

As described herein, a turbine stage 201 and/or compressor stage may comprise a turbine rotor (comprising, respectively, a plurality of concentric turbine or compressor blades, as the case may be). Further, as described herein, as the thermal environment surrounding each turbine or compressor stage varies during operation, the clearance area between the turbine or compressor blade tips and the BOAS assembly enclosing the turbine or compressor stage may diminish until the turbine or compressor blade tips would, unchecked, make contact with the BOAS assembly.

Therefore, to maintain proper clearance between a blade 202 comprising a turbine or compressor stage and a BOAS 204, cooling air may be passed from the compressor section 24 through, for example, a turbine stage 201 of the turbine section 28 to counteract the effects of the thermal expansion of the blade 202, thus decreasing or slowing the expansion of the blade 202. As described herein, cooler pressurized air may be stored within one or more air compartments, such as for example, air compartment 206 and channeled, as needed, into the turbine stage 201 by way of one or more bleed apertures 208a, 208b, 208c, 208d, 208e, and/or 208f disposed within the BOAS 204. In various embodiments, a bleed aperture 208a, 208b, 208c, 208d, 208e, and/or 208f may comprise a portion of the BOAS 204 defined by a fluid flow channel or path through which pressurized air may pass from an air compartment 206 through the BOAS 204.

As described above, however, the air maintained within the air compartment 206 may be stored at a pressure sufficient to induce leakage between the air compartment 206 and the BOAS 204, particularly where the thermal environment of the turbine section 28 is in flux. Thus, one or more seals, such as a first seal 210a and/or a second seal 210b may be placed between the air compartment 206 and the BOAS 204 to reduce or eliminate leakage resulting from a fluctuating thermal environment. The seals 210a and/or 210b may comprise "finger seals." A seal 210a and/or 210b may be coupled to a BOAS 204 (e.g., by way of a pressure exerted by the seal 210a and/or 210b against the BOAS 204 and/or by way of a retaining clip 310). Similarly, a first seal 210a may be coupled to a first vane support 212a, and/or a second seal 210b may be coupled to a second vane support 212b (e.g., by way of a pressure exerted by the seal 210a and/or 210b against the first vane support 212a and/or the second vane support 212b and/or by way of a retaining clip). In addition, a first seal 210a may be coupled to a first BOAS support 214a, having a forward portion 215a and/or a second seal 210b may be coupled to a second BOAS support 214b having an aft portion 215b (e.g., by way of a pressure exerted by the seal 210a and/or 210b against the first BOAS support 214a and/or the second BOAS support 214b and/or by way of a retaining clip). Further still, a first seal 210a and/or a second seal 210b may be coupled to any of the first BOAS support 214a, the second BOAS support 214b, the first vane support 212a, the second vane support 212b, the BOAS 204, and/or any other structure by way of one or more tabs or snap-in tabs, which may permit one component to snap in or clip to another component.

With reference to FIGS. 3 and 4, the first seal 210a may comprise a first portion 302 and/or a second portion 304. In addition, although the first seal 210a is described below with reference to FIGS. 3 and 4, the second seal 210b may include the elements and functionalities described herein with respect to the first seal 210a. In various embodiments, the first portion 302 may comprise a plurality of recesses or channels, such as a first channel 306a and/or second channel 306b. Further, in various embodiments, the second portion 304 may comprise a plurality of projections or "fingers," such as a first projection or finger 308a and/or a second projection or finger 308b. The projections 308a and/or 308b may, in various embodiments, extend into the channels 306a and/or 306b, respectively. In particular, the first projection 308a may extend into the first channel 306a, while the second projection 308b may extend into the second channel 306b. Thus, the channels 306a and/or 306b may slidably receive the projections 308a and/or 308b, respectively. An aft segment 302a of first portion 302 is located between a first surface 204c of the blade outer air seal 204 and a second surface 204d of the blade outer air seal 204. As shown in FIGS. 3 and 4, the first surface 204c of the blade outer air seal 204 and the second surface 204d of the blade outer air seal 204 are parallel to an axis of rotation "A" of the blade, and the first surface 204c is oriented toward the second surface 204d. Seal 210a further comprises a second portion 304, which includes a first projection 308a. The first projection 308a extends into the first channel 306a. An aft segment 304a of the second portion 304 is located between a first surface 214a1 of the blade outer air seal support 214a and a second surface 214a2 of the blade outer air seal support 214a. The first surface 214a1 of the blade outer air seal support 214a and the second surface 214a2 of the blade outer air seal support 214a are parallel to the axis of rotation A of the blade. The first surface 214a1 of the blade outer air seal support 214a is oriented toward the second surface 214a2 of the blade outer air seal support 214a.

Further, as shown with respect to FIG. 3, in various embodiments, the projections 308a and/or 308b may extend to a first depth within the channels 306a and/or 306b. The first depth may comprise a fully extended depth. In addition, as shown at FIG. 4, in various embodiments, the projections 308a and/or 308b may extend to a second depth within the channels 306a and/or 306b. The second depth may comprise any of a plurality of (not fully extended or partially extended) depths within the channels 306a and/or 306b. In addition, as one or both of the first portion 302 of the seal 210a (and/or 210b) and/or the second portion 304 of the seal 210a (and/or 210b) may vary in relation to the other respective portion, the portions 302 and/or 306 of the seals 210a and/or 210b may vary or slide relative to one another. This may permit the seals 210a and/or 210b to be adjusted, depending upon their orientation, axially and/or radially. For example, in various embodiments, the first portion 302 of a seal 210a and/or 210b may translate axially and/or radially, while the second portion 304 of the seal 210a and/or 210b may remain relatively static (moving, instead, in response to the thermal environment). However, in various embodiments, this arrangement may be reversed such that the first portion 302 may remain relatively static, while the second portion 304 may translate axially and/or radially. Thus, the seals 210a and/or 210b may permit a BOAS 204 to move or translate axially and/or radially with respect to one or more fan blades, such as fan blade 202.

In this manner, the seals 210a and/or 210b may achieve simultaneous objectives. For example, the seals 210a and/or 210b may eliminate or reduce unwanted escape of cooling air from the air compartment 206 into the turbine stage 201. Further, the seals 210a and/or 210b may accommodate an axial and/or radial expansion and/or contraction of the BOAS 204. Thus, as an aircraft performs maneuvering operations, the seals 210a and/or 210b may permit the turbine stage 201 to receive a controlled quantity of cooling air as well as accommodate a controlled axial and/or radial expansion and/or contraction of the BOAS 204 (and, thus, the BOAS system). In various embodiments, as shown at FIG. 2, a BOAS 204 may be translated radially by a pulling or pushing motion imparted to the BOAS 204 by a member or "puller" 216. The puller 216 may couple to the BOAS 204 and pull or push the BOAS 204 in a radial direction (e.g., a radially expanding or contracting direction) depending upon an operation of an aircraft. A puller 216 may be controlled by a computer-based system, such as a processor coupled to and in communication with a tangible, non-transient memory storing instructions for operation of the puller based upon an anticipated or actual maneuver or operation performed by an aircraft.

In various embodiments, the first portion 302 of the seal 210b (and/or 210a) and/or the second portion 304 of the seal 210b (and/or 210a) may be coated with a low friction or low wear coating or substance. More particularly, in various embodiments, the projections 308a and/or 308b and/or the channels 306a and/or 306b may be coated with a low friction or low wear coating or substance. Such substances may include Titanium Nitride (TiN), Titanium Aluminum Nitride, a solid lubricant filled nickel (Ni) plate, such as an electroless nickel with hexagonal Boron Nitride inclusions.

In various embodiments, one or more of Aluminum (Al), Chromium (Cr), Yttrium (Y), and the like may be added to any of the low friction and/or wear reducing substances described herein, as they may be beneficial in high operating temperature environments. Further, any of the low friction and/or wear reducing substances described herein may be manufactured by way of a chemical plating process and/or by inclusion of elemental and/or alloy particles during plating of a metallic and/or allow matrix, such as, for example, a Nickel (Ni) matrix. Further, in various embodiments, one or more dry film lubricants such as molybdenum disulfide ($MoS_2$) may be used to form a low friction and/or wear reducing coating.

In various embodiments, all and/or a portion of the projections 308a and/or 308b and/or the channels 306a and/or 306b may comprise one or more materials that include solid, semi-solid, and/or partially solid lubricant particles. For example, the projections 308a and/or 308b and/or the channels 306a and/or 306b may comprise MAXMET, a MAX phase particulate composite with a metal matrix, such as the MAXMET material described in U.S. Provisional Patent Application No. 61/788,056, which is hereby incorporated by reference.

Further, in various embodiments, one or more seals (e.g., seals 210a and/or 210b) may incorporate one or more split portions or channels. These split portions may accommodate assembly of each seal 210a and/or 210b. In addition, one or more split portions may accommodate motion of a first seal portion (e.g., portion 304) relative to a second seal portion (e.g., portion 302) and/or thermal transients arising within the structures. Thus, a split portion may permit a seal 210a and/or 210b, for example, to open circumferentially. This may accommodate a radial motion as well as an associated increase in seal circumference.

Further, in various embodiments, one or more projections or fingers 308a and/or 308b, for example, may be manufactured by a variety of suitable processes. For example, a projection may be manufactured by a casting process, a laser sintering process, a machining, grinding, milling, turning, electrical discharge machining, layup of sheet metal (such as by alternating layers of sheet metal to create an overlap of halves), and the like.

In addition, in various embodiments, one or more seals (e.g., finger seals such as seals 210a and/or 210b) may be employed to form a seal between any surface that translates or moves relative to another surface. For example, one or more finger seals may be situated between portions of a combustor section 26, such as between a BOAS and an air compartment situated in proximity to and/or forming all or a portion of a combustor section 26. Similarly, in various embodiments, one or more finger seals may be used in a variety of other applications, including applications in which heat is produced. For example, one or more finger seals may be used within a variety of furnace or combustor systems, such as those that conventionally power military and/or commercial aircraft.

In addition, as shown with respect to FIG. 5, a first seal 210a and/or a second seal 210b may be situated within a structure (such as relative to a BOAS 204, a BOAS support 214a and/or 214b and/or a vane support 212a and/or 212b), such that the first and/or second seals 210a and/or 210b may accommodate a relative axial motion between any of the BOAS 204, a BOAS support (214a and/or 214b) and/or a vane support (212a and/or 212b) and/or by any of the foregoing components. Thus, a seal 210a and/or 210b may accommodate a relative axial motion that may arise as a result, for example, of a fluctuating thermal environment as experienced, for example, within a turbine stage, a compressor stage, and/or combustor stage, and the like.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. As used herein, the term adjacent may mean in close proximity to, but does not necessarily require contact. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A gas turbine engine comprising:
   a blade;
   a blade outer air seal radially outward of the blade, the blade outer air seal comprising a plurality of bleed apertures that vent compressed air over a turbine stage of the gas turbine engine to cool the turbine stage during operation;
   a blade outer air seal support disposed radially outward of the blade outer air seal;
   a first seal coupled to a forward portion of the blade outer air seal and a forward portion of the blade outer air seal support, the first seal comprising,
      a first portion including a first channel extending into the first portion in a radial direction, wherein an aft segment of the first portion is located between a first surface of the blade outer air seal and a second surface of the blade outer air seal, wherein the first surface of the blade outer air seal and the second surface of the blade outer air seal are parallel to an axis of rotation of the blade, and wherein the first surface of the blade outer air seal is oriented toward the second surface of the blade outer air seal, and
      a second portion including a first projection, wherein the first projection extends into the first channel, wherein an aft segment of the second portion is located between a first surface of the blade outer air seal support and a second surface of the blade outer air seal support, wherein the first surface of the blade outer air seal support and the second surface of the blade outer air seal support are parallel to the axis of rotation of the blade, and wherein the first surface of the blade outer air seal support is oriented toward the second surface of the blade outer air seal support; and a second seal coupled to an aft portion of the blade outer air seal and an aft portion of the blade outer air seal support, the second seal comprising,
 a first portion including a first channel extending into the first portion of the second seal in the radial direction, and
 a second portion including a first projection, wherein the first projection of the second seal extends into the first channel of the second seal,
wherein the first seal and the second seal enable radial translation of the blade outer air seal.

2. The gas turbine engine of claim 1, wherein the first channel of the first portion of the first seal and the first channel of the second portion of the second seal slidably receives the first projection of the first portion of the first seal and the first projection of the second portion of the second seal.

3. The gas turbine engine of claim 2, wherein the first portion of the first and second seals comprises a second channel, and the second portion of the first and second seals comprises a second projection,
 the second channel of the first portion of the first and second seals slidably receives the second projection extending from the second portion of the first and second seals, and wherein the second channel of the first portion of the first and second seals extends into the first portion of the first and second seals in the radial direction.

4. The gas turbine engine of claim 1, wherein at least one of the first projection of the first seal or the first channel of the first seal is coated with a low friction substance.

5. The gas turbine engine of claim 1, wherein the at least one of the first projection of the second seal or the first channel of the second seal is coated with a low friction substance.

6. The gas turbine engine of claim 1, wherein at least one of the first seal or the second seal is coated with at least one of Titanium Nitride (TiN), Titanium Aluminum Nitride, and a solid lubricant filled with nickel (Ni).

7. A turbine stage of a turbine section of a gas turbine engine comprising:
 a blade;
 a blade outer air seal radially outward of the blade;
 a blade outer air seal support disposed radially outward of the blade outer air seal; and
 a first seal coupled to a forward portion of the blade outer air seal and a forward portion of the blade outer air seal support, the first seal comprising,
  a first portion including a first channel and a second channel, wherein the first channel and the second channel extend into the first portion of the first seal in a first direction, and wherein the first portion contacts a surface of the blade outer air seal, the surface of the blade outer air seal being parallel to an axis of rotation of the blade, and
  a second portion including a first projection and a second projection, wherein the first projection and the second projecting extend from the second portion of the first seal in direction, and wherein the second portion contacts a surface of the blade outer air seal support, the surface of the blade outer air seal support being parallel to the axis of rotation of the blade.

8. The turbine stage of claim 7, wherein the first projection slidably engages with the first channel, and wherein the second projection slidably engages with the second channel.

9. The turbine stage of claim 7, wherein the first seal controls cooling air dispensed from an air compartment to the turbine stage.

10. The turbine stage of claim 7, further comprising a puller that engages with the blade outer air seal and translates the blade outer air seal in a radial direction.

11. The turbine stage of claim 7, wherein the first seal is coated with a low friction substance.

12. The turbine stage of claim 7, further including:
 a second seal coupled to an aft portion of the blade outer air seal and an aft portion of the blade outer air seal support, the second seal comprising:
  a first portion including a first channel extending into the first portion of the second seal, and
  a second portion including a second projection, wherein the projection extends into the first channel of the second seal.

13. The turbine stage of claim 7, wherein the first channel of the first seal and the second channel of the first seal extend into the first portion of the first seal in radial direction.

* * * * *

UNITED STATES PATENT AND TRADEMARK OFFICE
CERTIFICATE OF CORRECTION

PATENT NO. : 10,001,022 B2
APPLICATION NO. : 14/394215
DATED : June 19, 2018
INVENTOR(S) : Christopher W Strock and Paul M Lutjen It is certified that error appears in the above-identified patent and that said Letters Patent is hereby corrected as shown below:

In the Specification

In Column 8, Line 17 please delete "first seal in direction" and therefore insert --first seal in the first direction--

Signed and Sealed this
Second Day of October, 2018

Andrei Iancu
*Director of the United States Patent and Trademark Office*